J. McVOY.
Process of Galvanizing Barbed Fence-Wire in the Coil.

No. 211,247. Patented Jan. 7, 1879.

UNITED STATES PATENT OFFICE.

JOHN McVOY, OF CHICAGO, ILLINOIS, ASSIGNOR OF ONE-HALF HIS RIGHT TO EDWARD M. CRANDAL, OF SAME PLACE.

IMPROVEMENT IN PROCESSES OF GALVANIZING BARBED FENCE-WIRE IN THE COIL.

Specification forming part of Letters Patent No. 211,247, dated January 7, 1879; application filed September 16, 1878.

*To all whom it may concern:*

Be it known that I, JOHN McVOY, of Chicago, in the county of Cook and State of Illinois, have invented a new and useful Process or Method of Galvanizing Barbed Fence-Wire in the Spool or Coil; and I do hereby declare the following to be a full, clear, and exact description thereof, which will enable others skilled in the art to which my invention appertains to use and practice the same, reference being had to the accompanying drawing, which is made part of this specification, and in which—

Figure 1:
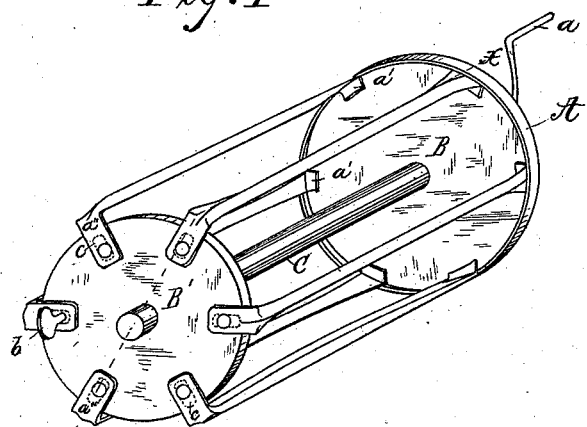
Figure 2:
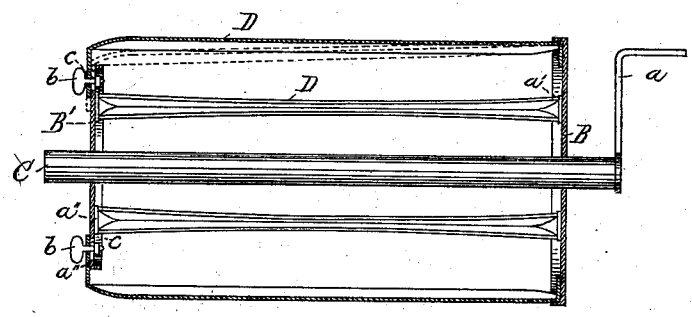

Figure 1 represents a perspective view of an adjustable reel used in my said process. Fig. 2 represents a longitudinal sectional view of the same at the line $x\ x$.

Like letters of reference indicate like parts.

The object of my invention is to galvanize barbed fence-wire in the spool or coil in a cheap and expeditious manner; and my invention consists in the process or method of galvanizing barbed fence-wire in the spool or coil, as hereinafter described and claimed.

The ordinary process of galvanizing barbed fence-wire is by drawing the barbed-wire strand slowly through a zinc-bath, and then through sand, for the purpose of cooling the zinc adhering to the wire; and I am not aware of barbed fence-wire having been galvanized in the spool or coil previous to my said invention, as hereinafter described.

In the drawing, A represents a reel, which is removably journaled in a suitable frame, (not shown,) so as to permit a rotary motion thereof by means of the crank $a$. B and B' represent the heads of the reel, which are permanently attached to the axle C. D D represent the horizontal bars or arms of the reel, which are firmly and respectively secured at their ends $a'$ to the head B, and the other ends thereof, $a''$, are curved so as to rest against the outer surface of the head B', and are adjustably attached thereto by means of set-screws $b$, which pass through the ends $a''$ and slots $c$, formed in the head B'.

The arms of the reel are first adjusted parallel to each other and at right angles with the plane of the head B. The barbed wire, as constructed, and as much as can be conveniently handled, is then wound loosely upon the reel.

The arms of the reel are then readjusted by loosening the set-screws and compressing said arms downward against the head B', and fastened in position, so as to give the reel a cone shape, as shown by dotted lines in Fig. 2 of drawing, the head B' of the reel being smaller in circumference than the head B. The barbed wire, as wound upon the reel, is then tied together by inserting one or more pieces of wire in or about the coil, and fastening the same together, so as to prevent the coil of barbed wire from springing or spreading out of position when removed from the reel. The wire, as coiled, is then withdrawn or removed from the reel and dipped or immersed in a zinc-bath, where it is allowed to remain for about one-half of a minute, when it is withdrawn from the bath and allowed to cool.

When the coil is sufficiently cool the reel is inserted within the coil, and the arms of the reel readjusted to their original position. The coil of galvanized barbed fence-wire is then unwound from said reel upon an ordinary spool, and is then ready for transportation.

It is obvious that the same result can be produced by the use of a cone-shaped reel in which the horizontal bars or arms are permanently attached to the heads of the reel; but, in practice, I prefer to use a reel provided with adjustable bars or arms, as shown and described, so as to insure an easy withdrawal of the reel from the coil.

By coiling the barbed fence-wire loosely upon the reel, and removing the said wire in the coil from the reel prior to galvanizing it, the barbs upon the wire keep the strands of wire from close contact, and so that the molten metal will flow freely upon and coat or cover all parts of the barbed fence-wire without danger of the coils adhering together, which cannot be accomplished with a coil of barbed fence-wire coiled in the ordinary manner.

By my device and process, as above described, I am enabled to galvanize barbed fence-wire in much less time and with less labor and expense than by the ordinary process of galvanizing barbed fence-wire.

Having thus described my invention, what I claim as new, and desire to secure by Letters Patent, is—

The process or method, substantially as described, of galvanizing barbed fence-wire in the spool or coil by coiling the barbed fence-wire loosely upon or around a reel capable of removal from said wire as coiled, and then removing the reel from the coil of barbed wire, and dipping or immersing said coil in a zinc-bath.

The foregoing specification signed by me this 10th day of July, 1878.

JOHN McVOY.

Witnesses:
N. COWLES,
G. H. HOFFMAN.